(12) United States Patent
Ullman et al.

(10) Patent No.: US 8,016,303 B1
(45) Date of Patent: Sep. 13, 2011

(54) WHEELED-VEHICLE DOLLY

(75) Inventors: Stuart G. Ullman, Kensington, MD (US); Ryan T. Hayleck, Fulton, MD (US); Michael J. Plackett, Corvallis, OR (US); Reginald B. Page, Gig Harbor, WA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 456 days.

(21) Appl. No.: 12/319,913

(22) Filed: Dec. 18, 2008

Related U.S. Application Data (60) Provisional application No. 61/132,337, filed on Jun. 10, 2008.

(51) Int. Cl.
*B62B 3/00* (2006.01)

(52) U.S. Cl. .................... 280/79.4; 414/426
(58) Field of Classification Search .............. 280/79.4; 414/426
See application file for complete search history.

(56) References Cited

U.S. PATENT DOCUMENTS

| | | | |
|---|---|---|---|
| RE17,918 E | | 1/1931 | Dinkelberg |
| RE18,493 E | | 6/1932 | Dinkelberg |
| 3,352,436 A | | 11/1967 | Reinecke |
| 3,789,947 A | * | 2/1974 | Blumrich ............... 180/6.48 |
| 3,876,255 A | * | 4/1975 | Ilon ...................... 301/5.23 |
| 4,050,597 A | * | 9/1977 | Hawkins ............... 414/427 |
| 4,240,773 A | * | 12/1980 | Terry .................... 410/47 |
| 4,383,681 A | * | 5/1983 | Walters ................. 269/17 |
| 4,401,405 A | * | 8/1983 | Ealet .................... 414/428 |
| 4,460,306 A | * | 7/1984 | Hawkins ............... 414/427 |
| 4,575,303 A | | 3/1986 | Lindell |
| 4,669,946 A | | 6/1987 | LoCodo |
| 4,690,605 A | | 9/1987 | Coccaro |
| 4,696,484 A | * | 9/1987 | Casey ................... 280/43.16 |
| 4,900,215 A | * | 2/1990 | Nowell ................. 414/428 |
| 4,913,459 A | * | 4/1990 | Smeitink .............. 280/641 |
| 4,968,208 A | | 11/1990 | Friberg |
| 4,986,714 A | | 1/1991 | Fernstrom |
| 5,037,263 A | | 8/1991 | Yamashita |
| 5,044,645 A | * | 9/1991 | Eltvik .................. 280/79.4 |
| 5,049,025 A | | 9/1991 | Roman |
| 5,110,067 A | * | 5/1992 | Sinkkonen ............ 244/50 |
| 5,184,930 A | | 2/1993 | Kuhn |
| 5,286,156 A | | 2/1994 | Ikenouchi et al. |
| 5,292,218 A | | 3/1994 | Ikenouchi et al. |
| 5,302,075 A | * | 4/1994 | Zschoche .............. 414/428 |
| 5,320,473 A | | 6/1994 | Arnold et al. |
| 5,336,037 A | * | 8/1994 | Curten et al. ......... 414/429 |
| 5,346,354 A | * | 9/1994 | Hellstrom ............. 414/430 |
| 5,362,194 A | * | 11/1994 | Kassebaum ........... 414/427 |
| 5,518,260 A | * | 5/1996 | Grignon ................ 280/402 |
| 5,709,520 A | * | 1/1998 | Pish ..................... 414/427 |
| 5,893,571 A | * | 4/1999 | Nowell ................. 280/43 |
| 5,984,616 A | * | 11/1999 | Youmans et al. ...... 414/563 |
| 6,104,314 A | * | 8/2000 | Jiang .................... 340/932.2 |

(Continued)

*Primary Examiner* — J. Allen Shriver, II
*Assistant Examiner* — Jacob Meyer
(74) *Attorney, Agent, or Firm* — Richard A. Morgan (57) ABSTRACT

A dolly is particularly adapted to lift, support and maneuver a four-wheel vehicle. The dolly comprises an adjustable, generally U-shaped frame assembly for each vehicle tire. The frame assembly has pairs of reciprocally opposed first and second frame members adapted to be positioned adjacent opposite sides of a tire and to lift the vehicle by way of the tires. A castering wheel assembly supports the vehicle on a ground surface. The frame assembly is pivotably mounted on a tractor.

7 Claims, 5 Drawing Sheets

U.S. PATENT DOCUMENTS

| | | | |
|---|---|---|---|
| 6,382,644 B1 * | 5/2002 | Rawlings | 280/79.4 |
| 6,733,226 B1 * | 5/2004 | Bonin | 414/429 |
| 6,789,994 B2 * | 9/2004 | Tortellier | 414/429 |
| 7,083,182 B2 * | 8/2006 | Clayton et al. | 280/402 |
| 7,097,406 B1 * | 8/2006 | Gang | 414/429 |
| D532,575 S * | 11/2006 | Oberg | D34/28 |
| 7,232,138 B2 * | 6/2007 | Shubert | 280/79.4 |
| 7,597,524 B2 * | 10/2009 | Hernandez | 414/428 |
| 7,740,439 B1 * | 6/2010 | Browning et al. | 414/428 |
| 7,815,201 B2 * | 10/2010 | Ceccarelli et al. | 280/79.4 |
| 2001/0038094 A1 * | 11/2001 | Lundy et al. | 254/1 |
| 2004/0146384 A1 * | 7/2004 | Whelan | 414/426 |
| 2005/0196256 A1 * | 9/2005 | Rodenkirch et al. | 414/426 |
| 2006/0045683 A1 * | 3/2006 | Huiming et al. | 414/426 |
| 2007/0075511 A1 * | 4/2007 | Shubert | 280/79.4 |
| 2007/0182115 A1 * | 8/2007 | Groomes | 280/79.4 |
| 2008/0101898 A1 * | 5/2008 | Hernandez | 414/426 |
| 2009/0250890 A1 * | 10/2009 | Ceccarelli et al. | 280/79.4 |

* cited by examiner

WHEELED-VEHICLE DOLLY

CROSS-REFERENCE TO RELATED APPLICATION

This application claims priority from U.S. Provisional Patent Application No. 61/132,337 filed Jun. 10, 2008, for a Wheeled-Vehicle Dolly, the disclosure of which is incorporated herein by reference in its entirety.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to a dolly for lifting, supporting and maneuvering a wheeled motor vehicle. The invention also relates to a wheel handler having opposed, horizontally reciprocable engaging elements.

2. Discussion of the Related Art

Deployment of military equipment requires loading of four-wheel motor vehicles onto a roll-on/roll-off ship for transport and unloading at a destination. Rapid deployment of equipment may be limited by the speed at which vehicles can be loaded and stowed below deck and later unloaded.

A motor vehicle is driven under its own power onto a transport ship and below deck to the hold. In the hold, the vehicle is positioned under its own power and parked in close proximity to other vehicles. Duration of the loading operation is dependent on the number of vehicles loaded, types of vehicles loaded, configuration of local dock and ramp facilities, configuration of the ship and on the experience and driving ability of the vehicle driver. The more closely the vehicles are parked, the more the operation is dependent of the driver's ability. Unloading is likewise dependent on another driver's experience and ability. Damage to the ship structure and deck is always a concern.

There is a need in the art of shipping military vehicles for an improvement in loading and maneuvering wheeled vehicles for close stowage aboard ship.

SUMMARY OF THE INVENTION

A dolly is particularly adapted for lifting and maneuvering a vehicle with tires. The dolly comprises an adjustable, generally U-shaped frame assembly. The U-shaped frame assembly has a base member and pairs of reciprocally opposed first and second frame members adapted to be positioned adjacent and to contact opposite sides of a tire. Each frame member has:

(i.) a horizontally elongated, tire support bar extending perpendicularly from the base member, (ii.) a castering wheel assembly supporting the tire support bar on a ground surface, (iii.) a roller support bracket assembly, mounted on the tire support bar, including a horizontally elongated roller.

A jack engages first and second frame members and is positioned to draw the opposed first and second frame members together, to contact the elongated rollers with a tire, and lift the tire with the vehicle attached thereto. A telescoping arm attached at a first end to the U-shaped frame and is attached to a pivot shaft.

A tractor assembly includes:

(i.) A vertically oriented pivot shaft provides pivoting of the pivot assembly in the horizontal plane.

(ii.) A tractor body provides attachment and support for the pivot shaft and support of the pivot assembly and U-shaped frame assembly attached thereto.

(iii.) Propulsion means is attached to the tractor body for motion of the tractor assembly on the ground surface.

The dolly is particularly adapted for loading a four wheel vehicle from a dock via a ramp onto a ship deck, carrying the vehicle below deck and maneuvering the vehicle in the hold for stowage. The dolly is also particularly adapted for removing a four wheel vehicle from close stowage in a ship hold.

The invention is described with reference to the drawing wherein numerals in the written description correspond to like-numbered elements in the several figures. The drawing discloses a preferred embodiment of the invention and is not intended to limit the generally broad scope of the invention as set forth in the claims.

DETAILED DESCRIPTION OF THE INVENTION

The dolly consists of a lift and support mechanism, a telescoping arm and a tractor. Four lift and support mechanisms are attached to the telescoping arm which is pivotably mounted on the tractor. The telescoping arm is retracted for clearance and maneuvering. In the retracted configuration the dolly is driven under the four-wheel vehicle. The telescoping arm is then extended to position a U-shaped frame assembly around each tire. This positions an elongated horizontally disposed roller on each side of each tire. The elongated roller axle is parallel to and below the vehicle axle to which the tire is attached. The vehicle is lifted by drawing the rollers together. The rollers rotate as they lift the tires onto the rollers. The four-wheel vehicle is lifted with the tires. Castering wheels support the weight of the lifted four-wheel vehicle. The tractor moves the castering wheel supported four-wheel vehicle in any direction. It can be positioned in close proximity to a bulkhead or to another vehicle. Turning of the vehicle is independent of the turning radius of the vehicle and depends on the castering wheels. The four-wheel vehicle is set down on a parking spot. The U-shaped frame assemblies are disengaged and the dolly withdrawn from under the vehicle in any available direction.

Lift and Support Mechanism

Figure 1A:
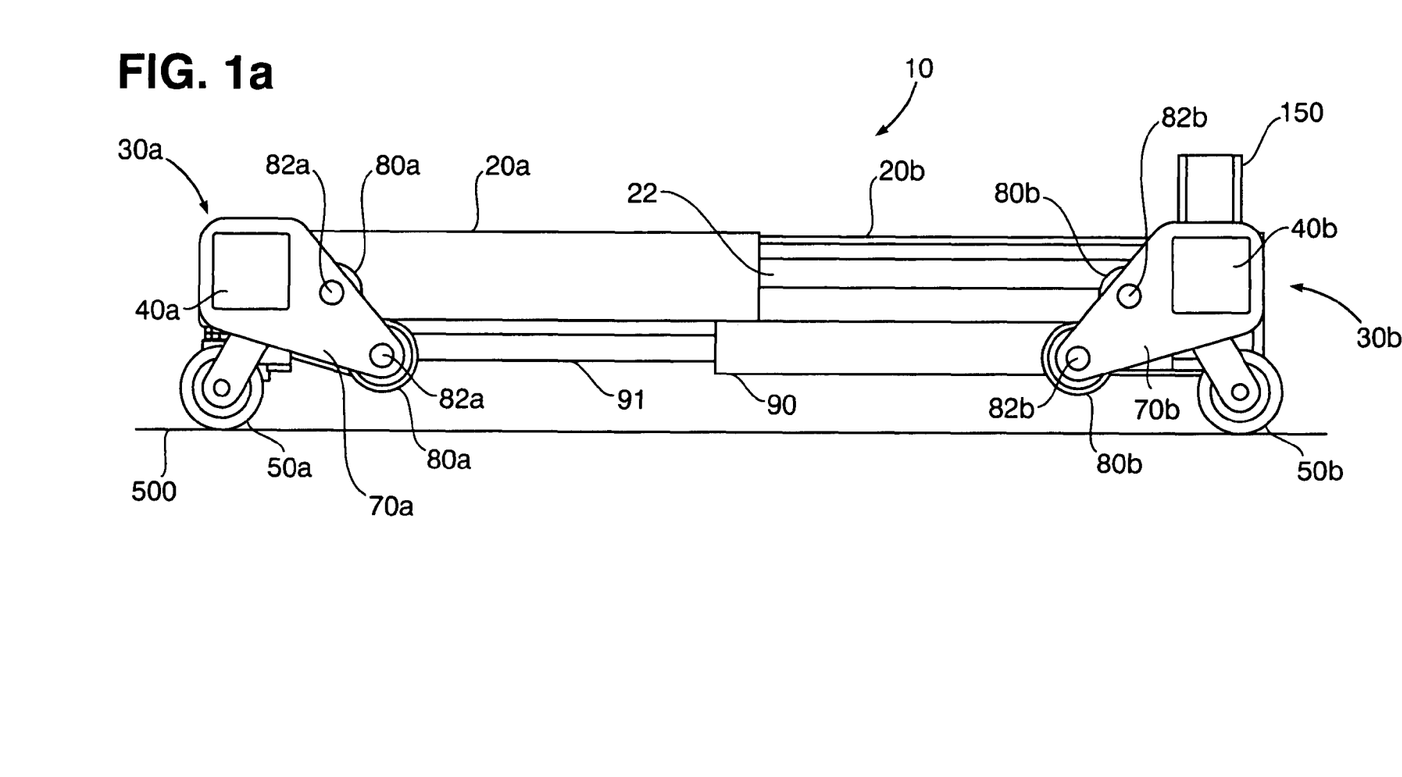
FIG. 1a is a side view of a U-shaped frame assembly.
Figure 1B:
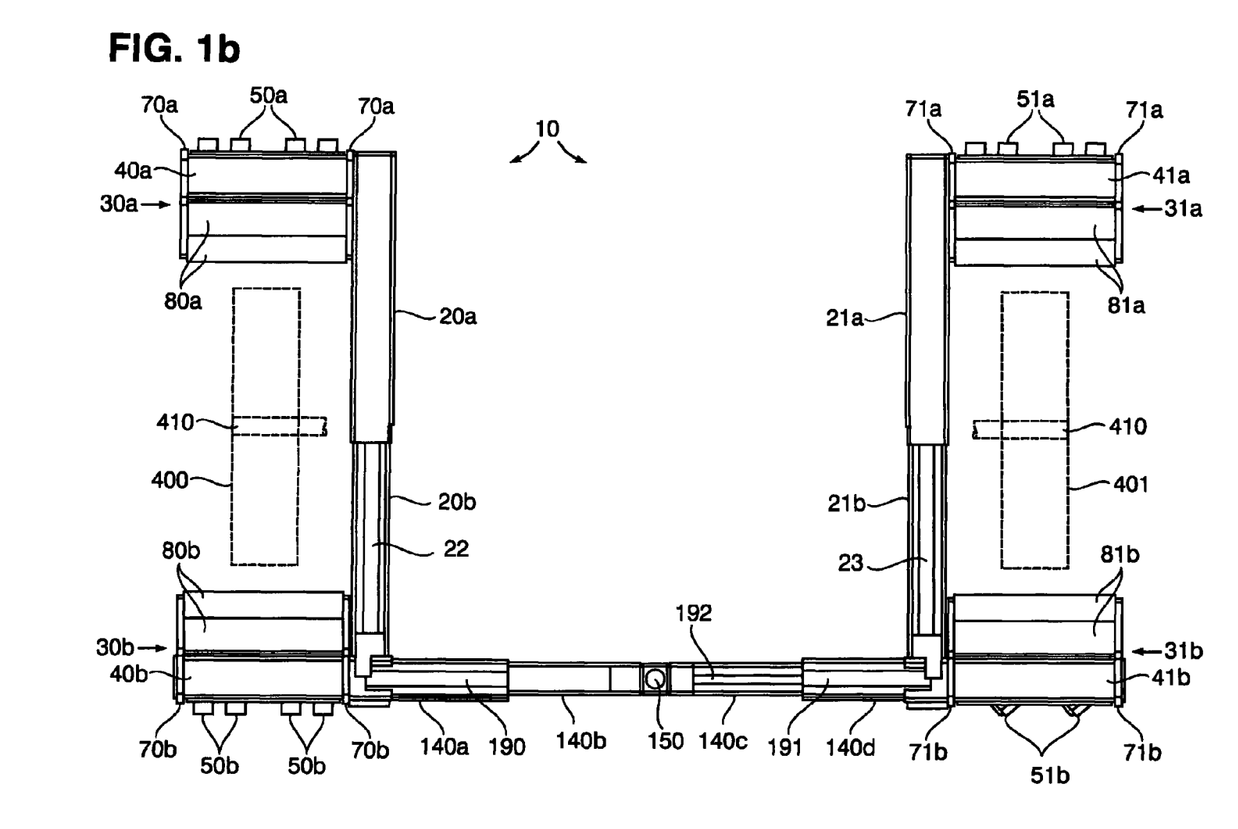
FIG. 1b is an overhead plan view of a U-shaped frame assembly.

FIG. 1a is a side elevated view of the left U-shaped frame assembly 10 shown in FIG. 1b. FIG. 1b is an overhead plan view of two cooperating U-shaped frame assemblies 10. In FIG. 1b, phantom lines indicate vehicle left tire 400 and right tire 401 both attached to a four-wheel vehicle indicated by vehicle axle 410. Two assemblies shown in FIG. 1b are required to lift a four-wheel vehicle. One assembly is attached to each of two ends of a telescoping arm.

A pair of opposed, reciprocating frame members, indicated by first frame member 30a and second frame member 30b, are positioned adjacent opposite sides of left tire 400. Likewise first frame member 31a and second frame member 31b are positioned adjacent opposite sides of right tire 401. Each pair of opposed, reciprocating frame members has cooperating sub-components. Each of first frame member 30a and 31a and second frame member 30b and 31b has a horizontally elongated tire support bar. First frame members 30a and 31a have tire support bar 40a and 41a respectively. Second frame members 30b and 31b have tire support bar 40b and 41b respectively. Each tire support bar is supported on a ground surface 500 by castering wheels 50a and 50b on one side and castering wheels 51a and 51b on the other. The castering wheels swivel in the ground surface plane providing 360° directional movement with a small turning radius. Roller support brackets 70a are mounted on the tire support bar 40a and roller support brackets 70b are mounted on the tire support bar 40b. Roller support brackets 71a are mounted on the tire support bar 41a and roller support brackets 71b are mounted on tire support bar 41b. Elongated rollers 80a, 80b, 81a and 81b are horizontally mounted on axles attached to the roller support brackets. Rollers 80a and 80b rotate on roller axles 82a and 82b. Roller axles for rollers 81a and 82a are not shown in the drawing. The elongated rollers 80a, 80b, 81a, 81b and the roller axles 82a and 82b on which they rotate are horizontally elongated and are parallel to vehicle axle 410. Two rollers per bracket have been found to work well in a prototype. One roller per bracket is sufficient. Three vertically staggered rollers per bracket also work well. All rollers are on horizontally elongated axles positioned parallel to the vehicle axle 410.

A telescoping base member comprises base member section 20a and base member section 20b on one side and base member section 21a and base member section 21b on the other side. Jack 90 is functionally attached to section 20a and 20b and moves section 20b telescopically in-and-out of section 20a directed and constrained by guide 22. Jack 90 in the drawing is a hydraulic cylinder with extending arm 91. The term jack is intended to include equivalent alternatives including a pneumatic cylinder, jack screw, ratchet and the like. It is seen in FIG. 1b that base member section 20a, base member section 20b, first frame member 30a and second frame member 30b make up a U-shaped frame assembly 10. The corresponding members on the right make up a second U-shaped frame assembly 10. The motion of jack 90 with extending arm 91 causes the reciprocal and opposed movement of first frame member 30a and second frame member 30b toward each other and away from each other. The movement is constrained by guide 22 on the left side and guide 23 on the right side.

The left horizontally elongated tire support bar 40b is attached to the right horizontally elongated tire support bar 41b through attachment bar 140 comprising telescoping segments 140a, 140b, 140c and 140d. Segment 140a is an extension of tire support bar 40b. Segment 140a moves telescopically with segment 140b. Hydraulic jack 190 provides the motive force for in-and-out telescoping motion of sections 140a and 140b. Segment 140c telescopes with segment 140d. Hydraulic jack 191 provides motive force with extendable arm 192 for in-and-out telescoping motion. Segment 140d is an extension of the right tire support bar 41b and is attached to it. Jack 191 is hydraulically operated and acts with extendable arm 192 to extend or retract the two sections 140c and 140e.

Hydraulic lines, control valves and solenoid controls are carried in a hydraulic hose box (not shown) with hydraulic hoses (not shown) extending to the hydraulic jacks in the left and right U-shaped frame assemblies. Attachment bar 140 provides support for pivot shaft 150 through which it is attached to telescoping arm 200 on tractor 300. Pivot shaft 150 is also mounted on and attached to attachment bar 140.

Figure 2A:
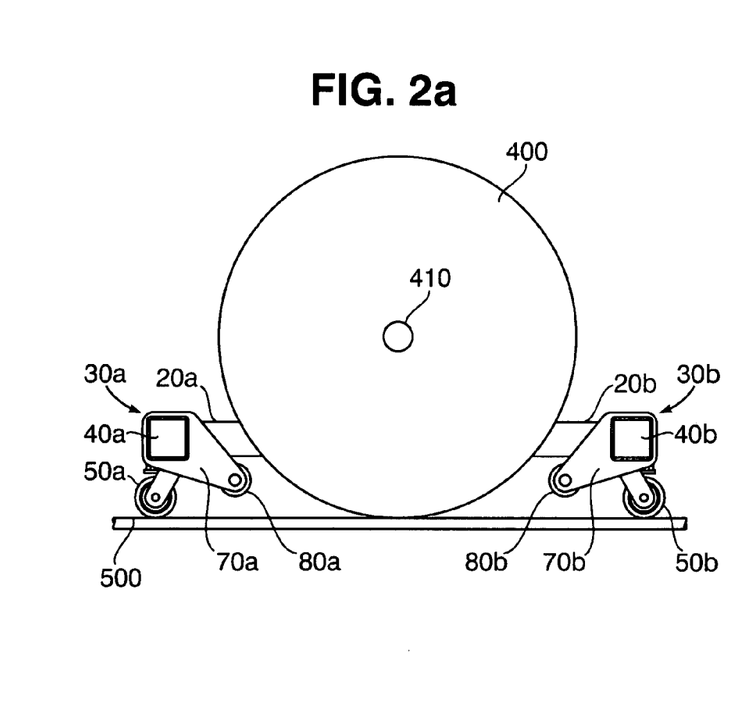
FIG. 2a and FIG. 2b are schematic views of reciprocally opposed first and second frame members in the open and closed position in relation to a vehicle tire.
Figure 2B:
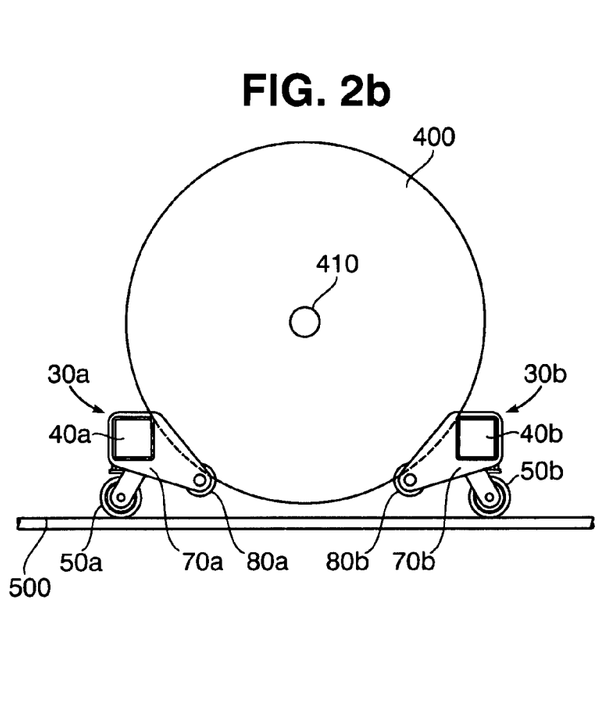

FIGS. 2a and 2b are schematic representations of the left U-shaped frame assembly 10 in FIG. 1a and 1b. In FIGS. 2a and 2b, horizontally elongated rollers 80a and 80b are mounted on roller axles positioned well below the vehicle axle 410 of left tire 400. In FIG. 2a, left tire 400 is shown between pairs of reciprocally opposed first and second frame members 30a and 30b. Tire 400 is in contact with ground surface 500. Jack 90 is positioned to telescopically move first base member 20a with second base member 20b. Jack 90 is actuated to draw first base member 20a and second base member 20b together. This causes horizontally elongated rollers 80a and 80b to contact tire 400 from both sides. As the rollers are drawn closer together they roll the tire 400 up onto the rollers 80a and 80b and also may roll it onto horizontally elongated tire support bar 40a and 40b. Roller support brackets 70a and 70b provide support of rollers 80a and 80b and connection with tire support bar 40a and 40b. Horizontally elongated tire support bar 40a and 40b are supported by castering wheel assemblies 50a and 50b. In FIG. 2b, tire 400 has lost contact with ground surface 500 and is above it. Tire 400 is held within the U-shaped frame assembly, with support through the assembly, from the castering wheel assemblies 50a and 50b. The castering wheel assemblies 50a and 50b provide support and 360° movement of the vehicle on ground surface 500. Tire 400 and the attached four-wheel motor vehicle can move in any direction on ground surface 500 and can make turns of any angle. The vehicle can actually be rotated on its axis. Maneuvering the four-wheel motor vehicle is independent of the vehicle's own turning radius.

Four U-shaped frame assemblies coordinate to lift the four vehicle tires. This is achieved with similar lift components and coordinated supply of hydraulic fluid to the hydraulic jacks. The left horizontally elongated tire support bar 40b is attached to the right horizontally elongated tire support bar 41b through attachment bar 140 comprising telescoping segments 140a, 140b, 140c and 140d. Segment 140a is an extension of tire support bar 40b. Segment 140a telescopes with segment 140b. Hydraulic jack 190 with an extendable arm (not shown) provides in-and-out telescoping motion. Segment 140c telescopes with segment 140d. Hydraulic jack 191 and extendable arm 192 provide for in-and-out telescoping motion. Segment 140d is an extension of the right tire support bar 41b and is attached to it. Jack 191 is hydraulically operated and acts to extend or retract the two sections 140c and 140e. Likewise, sections 140a and 140b are telescoping by means of a hydraulic jack 190, similar to jack 191.

Tractor 300

Figure 3:
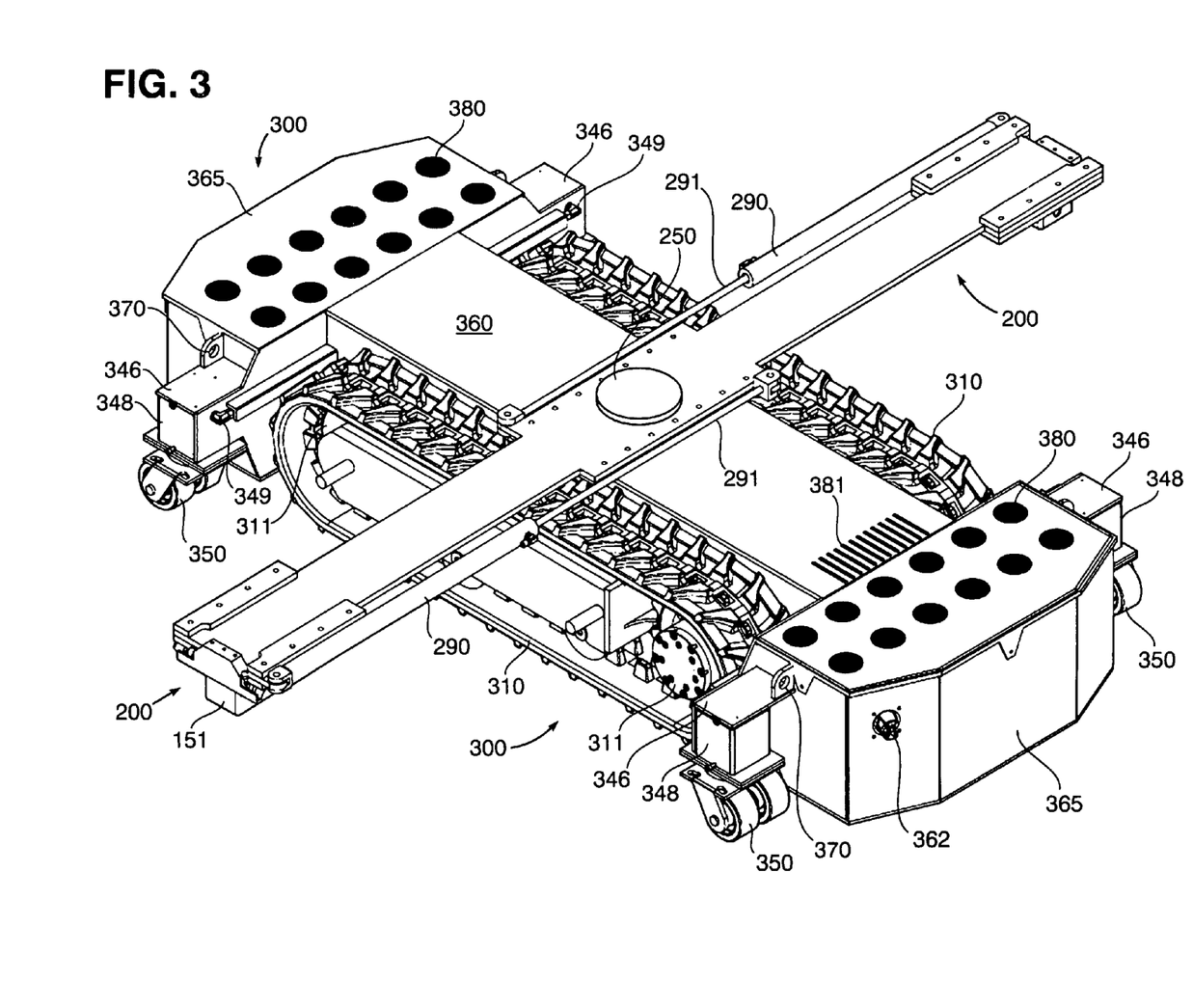
FIG. 3 is a perspective view of a tractor and telescoping arm.

Reference is made to FIG. 3 which is a perspective view of a tractor 300 and telescoping arm 200 assembly. The telescoping arm 200 is joined to attachment bar 140 by inserting pivot shaft 150, shown in FIG. 1a, into receiver block 151 positioned at each end of telescoping arm 200. Hydraulic hoses (not shown) provide hydraulic fluid to drive the hydraulic jacks. The hoses are connected to tank pressured by battery powered pump (both not shown) inside the tractor body 360. The telescoping arm 200 is rotated in the horizontal plane about pivot shaft 250 and extended or contracted with hydraulic jack 290 and extendable arm 291.

The tractor travels on treads 310 propelled by drive wheels 311. Each drive wheel 311 is driven by an electric motor (not shown) in the tractor body 360. Each tread is independently moveable to turn and steer the tractor. Both treads can be moved forward or backward in tandem. One tread can be moved and the other not moved. Or, the treads can be moved in opposite directions. The tractor is steered forward, backward, to the left, to the right or pivoted by direction of motion of the treads 310. The telescoping arm can be pivoted about pivot shaft 250 or the treads 310 can be rotated in opposite directions to pivot tractor 300. Pivoting of the treads is coarser control accomplished by differential control of drive wheels 311 and treads 310. Pivoting of telescoping arm on pivot shaft 250 is finer control accomplished by hydraulic control.

The four drive wheel electric motors are driven by batteries (not shown) contained in two battery boxes 365. Control interface 362 is a control panel providing for a battery on/off switch, for control of the hydraulic system including the pump and supply tank and for steering the tractor. Control interface 362 also provides for connection of a battery charger (not shown) in battery box 365 to a 115 AC volt receptacle (not shown). Vent slots 380 in battery box 365 allow heat to vent from the battery charger. Vent slots 381 in tractor body 360 allow heat to vent from an electric motor and pump.

Right angle support brackets 346 are attached to the battery box 365 and through battery box 365 to the tractor body 360. Four hydraulic lift jacks 348 are attached at one end under the right angle support brackets 346 and at the other end to tractor castering wheels 350. Hydraulic supply hoses 349 supply the four hydraulic lift jacks 348 to lift the tractor body and treads 311 to support the tractor on tractor castering wheels 350. The tractor and tractor treads 310 can be lifted off of the ground surface. In this case, tractor castering wheels 350 are the sole support of the tractor on the ground surface 500. The tractor can then be moved by means of tractor castering wheels 350. This is advantageous when a deck or ramp is wet or sandy and the treads 310 slip on the surface. It may also be advantageous to tow the tractor up a ramp with a cable and winch. It is also of use if the tractor is towed with a tow vehicle.

Right angle support brackets 346 also serve as lifting pads. Lifting pad eyes 370 are fixedly attached to right angle support bracket 346 and battery box 365 to provide a point for lifting the tractor with a crane (not shown). Lifting pad eyes 370 are also used to tie the tractor down during transport.

Figure 4:
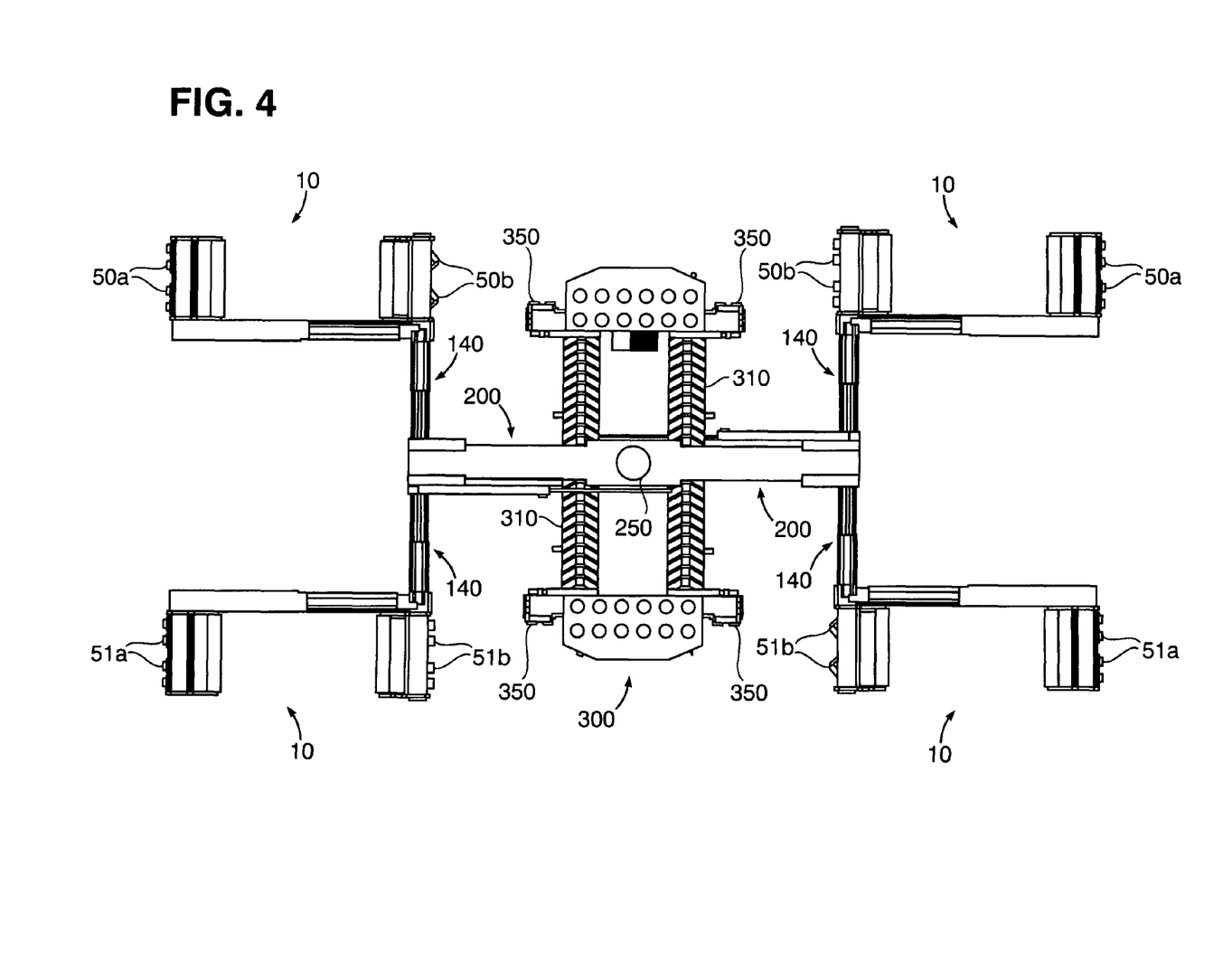
FIG. 4 is an overhead view of a tractor and telescoping arm with four U-shaped frame assemblies.

FIG. 4 is an overhead plan view showing the tractor 300 and telescoping arm 200 shown in FIG. 3 with four U-shaped frame assemblies 10 shown in FIG. 1b. A lift and support mechanism comprises two U-shaped frame assemblies 10 attached at each of two ends of the telescoping arm 200. This model of the dolly was built and successfully tested. Tractor 300 travels on treads 310. In the alternative, the tractor can be jacked up to lift treads 310 off the ground surface. Tractor 300 is then supported on pairs of castering wheels 350.

Telescoping arm 200 is shown in the retracted position. Telescoping arm 200 is mounted on tractor 300 through pivot shaft 250. Telescoping arm 200 is pivotably attached at each end to an attachment bar 140. Attachment bar 140 is attached at each end to a U-shaped frame assembly 10. Each U-shaped frame assembly 10 is supported on pairs of castering wheels 50a, 50b, 51a and 51b.

The dolly moves a four-wheel vehicle in any direction so that it can be stowed or recovered from a hold. The omni-directional moving ability of the dolly eliminates the limitation of the turning radius of the vehicle steering mechanism that is a difficulty in parallel parking. Since vehicles can be moved sideways, or in any other direction along the deck, any open path to the vehicle in the hold is sufficient to extract it from the hold. The vehicle is moved under electric power. The vehicle engine is not started. These allows for quick, quiet and exhaust gas free movement. As a result, there is no vehicle exhaust gas in the hold.

The tractor travels on treads, preferably non-slipping polymer treads. In the alternative, the tractor is driven by omni-directional wheels, such as Mecanum wheels. This is accomplished by removing treads 310 and replacing drive wheels 311 with Mecanum wheels. Each of four Mecanum wheels is driven by its own electric motor. Independent control of each of the four electric motors must be provided for full utility.

Omni-directional wheels are taught in U.S. Pat. No. 3,789,947 to J. F. Blumrich, incorporated herein by reference. Mecanum wheels are taught in U.S. Pat. No. 3,876,255 for Wheels for a Course Stable Selfpropelling Vehicle Movable in any Desired Direction on the Ground or Some Other Base to B. E. Ilon incorporated herein by reference.

Once lifted, the weight of the wheeled-vehicle is supported by castering wheels. It is preferred that there be two to four pairs of castering wheels per tire. The term castering wheels is intended to include equivalents thereof. Equivalents include all the many variations of castering wheels, powered castering wheels and air bearings. Urethane is an excellent choice for the material of construction for castering wheels.

It was found in the dolly constructed, that friction between the polymer treads and the deck was sufficient to provide braking. In an extreme braking condition, the vehicle wheels would maintain contact with the deck and the vehicle tires and brakes would supplement braking of the dolly. In the alternative, castering wheels with brakes can be used. In another alternative, brake pads are attached to the bottom of the tractor body to press against the deck.

The foregoing discussion discloses and describes embodiments of the invention by way of example. One skilled in the art will readily recognize from this discussion, that various changes, modifications and variations can be made therein without departing from the spirit and scope of the invention as defined in the following claims.

What is claimed is:

1. A dolly for a vehicle with tires, said dolly comprising:
   a. an adjustable, generally U-shaped frame assembly for each tire, the frame assembly having a base member and pairs of reciprocally opposed first and second frame members and adapted to be positioned adjacent opposite sides of a tire, each frame member having:
      (i.) a horizontally elongated, tire support bar extending perpendicularly from the base member,
      (ii.) a castering wheel assembly supporting the tire support bar on a ground surface,
      (iii.) roller support brackets, mounted on the tire support bar and supporting vertically staggered, horizontally elongated rollers,
   b. the base member including a jack, the jack engaging first and second frame members, and positioned to reciprocally draw the opposed first and second frame members together, to contact the elongated rollers with a tire, and lift the tire with the vehicle attached thereto,
   c. a telescoping arm attached at a first end and at a second end to two U-shaped frame assemblies and mounted on a tractor body through a vertically oriented pivot shaft; and
   d. a tractor assembly including:
      (i.) the vertically oriented pivot shaft providing pivoting of the telescoping arm in the horizontal plane about a vertical axis, the vertically oriented pivot shaft attached to
      (ii.) the tractor body providing support for the telescoping arm,
      (iii.) propulsion means attached to the tractor body providing for motion of the tractor along the ground surface.

2. The dolly of claim 1, wherein the propulsion means comprises continuous treads.

3. The dolly of claim 1, wherein the propulsion means comprises omni-directional wheels.

4. The dolly of claim 1, wherein the propulsion means comprises Mecanum omni-directional wheels.

5. The dolly of claim 1, additionally comprising control means.

6. The dolly of claim 1, wherein the telescoping arm is attached at each of two ends to the two U-shaped frame assemblies through a telescoping attachment bar, one U-shaped frame assembly attached at each end of the telescoping attachment bar.

7. The dolly of claim 1, wherein the telescoping arm is attached at each of two ends to the two U-shaped frame assemblies through a telescoping attachment bar, one U-shaped frame assembly attached at each end of the telescoping attachment bar and wherein the telescoping attachment bar is pivotally attached to the telescoping arm.

* * * * *